United States Patent [19]

Iwatsuki et al.

[11] Patent Number: 4,815,340

[45] Date of Patent: Mar. 28, 1989

[54] DEVICE FOR CONTROLLING ENGINE TORQUE IN VEHICLE

[75] Inventors: Kunihiro Iwatsuki; Yoshio Shindo, Both of Toyota, Japan

[73] Assignee: Toyota Jidosha Kabushiki Kaisha, Aichi, Japan

[21] Appl. No.: 936,502

[22] Filed: Dec. 1, 1986

[30] Foreign Application Priority Data

Dec. 5, 1985 [JP] Japan .................... 60-273650

[51] Int. Cl.$^4$ .................................. B60K 41/06
[52] U.S. Cl. ...................................... 74/858
[58] Field of Search .................. 74/858, 857, 859; 123/419, 436; 364/431.04, 431.05

[56] References Cited

U.S. PATENT DOCUMENTS

| | | | |
|---|---|---|---|
| 4,262,335 | 4/1981 | Ahlen et al. | 364/431 |
| 4,403,527 | 9/1983 | Mohl et al. | 74/851 |
| 4,442,815 | 4/1984 | Ninomiya | 123/436 |
| 4,508,075 | 4/1985 | Takao et al. | 123/339 |
| 4,594,667 | 6/1986 | Yasuhara | 364/431.06 |

FOREIGN PATENT DOCUMENTS 55-69738 5/1980 Japan .

Primary Examiner—Leslie A. Braun
Assistant Examiner—Dwight Diehl
Attorney, Agent, or Firm—Parkhurst, Oliff & Berridge

[57] ABSTRACT

A device for controlling engine torque in a vehicle which includes an engine and an automatic transmission, and for changing the engine torque during shifting of the automatic transmission by an engine torque change value determined in association with at least engine load. The device includes a detecting device for detecting at least one of intake air pressure, cooling water temperature of an engine, oil temperature of an engine, and oil temperature in a hydraulic control device of the automatic transmission; a determining device for determining the engine torque change value in further association with at least one of the intake air pressure, the cooling water temperature of the engine, the oil temperature of the engine, and the oil temperature in the hydraulic control device of the automatic transmission; and a changing device for changing engine torque during-shifting of the automatic transmission by the determined engine torque change value. With the engine torque controlling device, satisfactory shift characteristics can be constantly obtained irrespective of the influence of enviromental factors on either engine output or the behavior of a hydraulic control device of the automatic transmission, so that shift shock can be decreased and the durability of the frictionally engaging devices can be improved.

20 Claims, 8 Drawing Sheets

| SHIFT POSITION | | C1 | C2 | C0 | B1 | B2 | B3 | B0 | F1 | F2 | F0 |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| | 2 | ○ | | ○ | | ○ | | | ◎ | | ◎ |
| | 3 | ○ | ○ | ○ | | ○ | | | | | ◎ |
| | 4 | ○ | ○ | | | ○ | | ○ | | | |
| 2 | 1 | ○ | | ○ | | | | | | ◎ | ◎ |
| | 2 | ○ | | ○ | ○ | ○ | | | ◎ | | ◎ |
| | 3 | ○ | ○ | ○ | | ○ | | | | | ◎ |
| L | 1 | ○ | | ○ | | | ○ | | | ◎ | ◎ |
| | 2 | ○ | | ○ | ○ | ○ | | | ◎ | | ◎ |

INTAKE AIR TEMPERATURE

OIL TEMPERATURE

ATMOSPHERIC PRESSURE

FIG.6

| As | 1→2 E PATTERN | 1→2 P PATTERN | 2→3 E PATTERN | 2→3 P PATTERN | 3→4 E PATTERN | 3→4 P PATTERN |
|---|---|---|---|---|---|---|
| As7 | 20 | 25 | 15 | 20 | 15 | 20 |
| As6 | ↑ | ↑ | ↑ | ↑ | ↑ | ↑ |
| As5 | 18 | 20 | 13 | 15 | 13 | 15 |
| As4 | 15 | 18 | 10 | 13 | 10 | 13 |
| As0-3 | 0 | 0 | 0 | 0 | 0 | 0 |

DEVICE FOR CONTROLLING ENGINE TORQUE IN VEHICLE

BACKGROUND OF THE INVENTION

This invention relates to a device for controlling engine torque in a vehicle, and more particularly to a device for controlling engine torque in a vehicle mounted thereon with an automatic transmission, wherein satisfactory shift characteristics can be obtained in association with environmental conditions while the engine is running.

Previously, automatic transmissions have been constructed such that a gear mechanism and a plurality of frictionally engaging devices are provided, and a hydraulic control system is operated to selectively change the engagement of the frictionally engaging devices, to thereby achieve any one of a plurality of gear stages.

There have been also proposed many methods of integrally controlling the automatic transmission and the engine, wherein engine torque is changed during shifting (e.g. Japanese Patent application Laid-Open (Kokai) No. 69738/1980). When the amount of torque transmitted from the engine is changed during shifting, the amount of absorbed energy in members of the automatic transmission or in the frictionally engaging devices for controlling these members can be decreased, so that the shifting is completed with a small shift shock for a short period of time. As a result, a satisfactory shift feeling can be given to a driver, and the frictionally engaging devices can be improved in durability.

Heretofore, when engine torque is changed during shifting, the amount of change is defined in association with the type of shifting and engine load (throttle opening, etc.). However, there is a problem which cannot be satisfactorily solved by this. In particular, even with a constant throttle opening, variations in engine intake air pressure (atmospheric pressure or boost pressure) result in considerable engine output fluctuations. Consequently, where the amount of change in engine torque for a certain shifting is determined only in association with throttle opening, the engine torque after the change fluctuates, thus likewise resulting in fluctuations in the shift characteristics.

In general, the lower the cooling water temperature and the oil temperature, the less the occurrence of engine knocking. Therefore, when the cooling water temperature and the oil temperature are low, control is often performed to advance ignition timing. In this case, even with the same throttle opening, the engine torque is rather high.

On the other hand, even when a constant engine output is used, i.e. the engine torque after the change is the same as before, the optimal turning point of frictionally engaging devices is different depending upon whether the oil temperature in the frictionally engaging devices in the automatic transmission is high or low. In general, when the oil temperature is very low, the visocity of the oil is high, so that the responsiveness of the frictionally engaging devices becomes rather slow. Furthermore, when the oil temperature becomes high, the amount of oil leakage in oil lines increases, whereby the responsiveness of the frictionally engaging devices also becomes rather slow. This means that, as viewed from the side of the automatic transmission, such an adverse influence is brought about when the engine output is shifted to the higher side.

SUMMARY OF THE INVENTION

The present invention has been developed to obviate the above-described disadvantages of the prior art. The present invention has as its object the provision of a device for controlling engine torque in a vehicle, wherein satisfactory shift characteristics can be constantly obtained, irrespective of environmental factors which influence both engine output and the behavior of a hydraulic control device of an automatic transmission so that shift shock can be decreased and the durability of frictionally engaging devices improved.

To achieve the above-described object, as the technical gist is shown in FIG. 1, the present invention is a device for controlling engine torque in a vehicle mounted which includes an engine and an automatic transmission, and for changing the engine torque during shifting of the automatic transmission by an engine torque change value determined in association with at least engine load, the device comprising:

means for detecting at least one of the following: intake air pressure (boost pressure), cooling water temperature and of an engine oil temperature of an engine, and oil temperature in a hydraulic control device of the automatic transmission;

means for determining the engine torque change valve in further association with at least one of the intake air pressure, the cooling water temperature of the engine, the oil temperature of the engine, and the oil temperature in the hydraulic control device of the automatic transmission; and means for changing engine torque during shifting of the automatic transmission by the amount of change value.

According to the present invention, the engine torque change value is set in association with at least one of the intake air pressure, the cooling water temperature of the engine, the oil temperature of the engine, and the oil temperature in the hydraulic control device of the automatic transmission, so that fluctuations in engine output, fluctuations in the behavior of the frictionally engaging devices, or the like due to changes in environmental factors can be properly countered, thus resulting in satisfactory shift characteristics compatible with improved durability of the frictionally engaging devices.

The preferred embodiment employs as the means for changing the engine torque one of, means for changing the ignition timing, means for changing the fuel injection quantity; or means for changing the intake air quantity.

Furthermore, in the preferred embodiment, the oil temperature in the hydraulic control device of the automatic transmission is estimated by detection of the engine cooling water temperature or engine oil temperature.

BRIEF DESCRIPTION OF THE DRAWINGS

The above objects, features and advantages of the present invention, as well as other objects and advantages thereof, will become more apparent from the description of the invention which follows, taken in conjunction with the accompanying drawings, wherein like reference characters designate the same or similar parts and wherein:

FIG. 3 is a chart showing the operating conditions of the respective frictionally engaging devices at every gear stage of the automatic transmission;

FIG. 6 is a chart showing an example of a map for searching a basic lag angle.

DETAILED DESCRIPTION OF THE PREFERRED EMBODIMENTS

The embodiments of the present invention will be described in detail with reference to the accompanying drawings.

Figure 1:
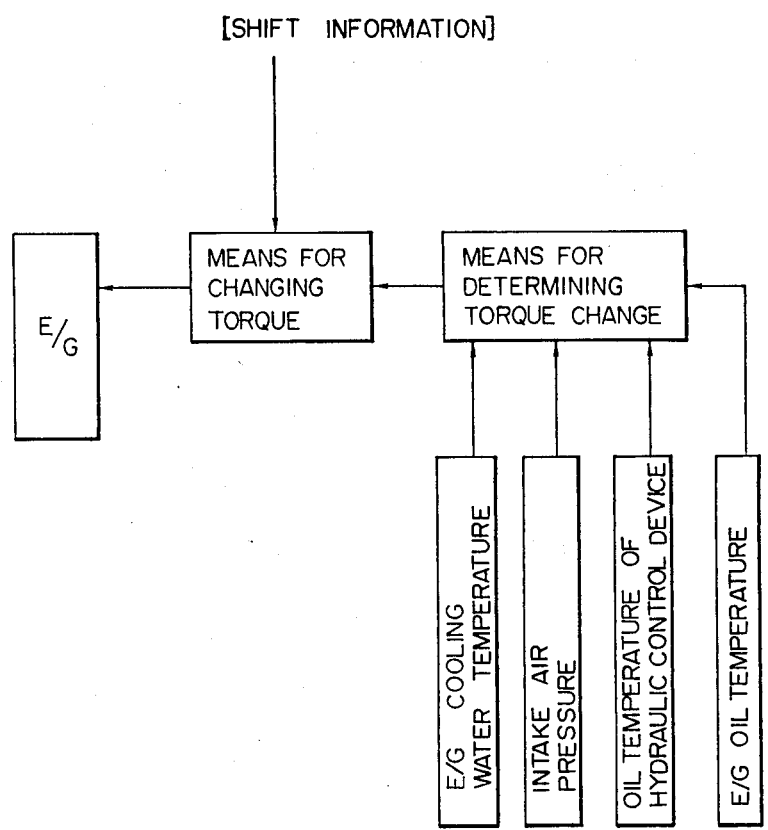
FIG. 1 is a block diagram showing the technical gist of the device for controlling engine torque in a vehicle according to the present invention.
Figure 2:
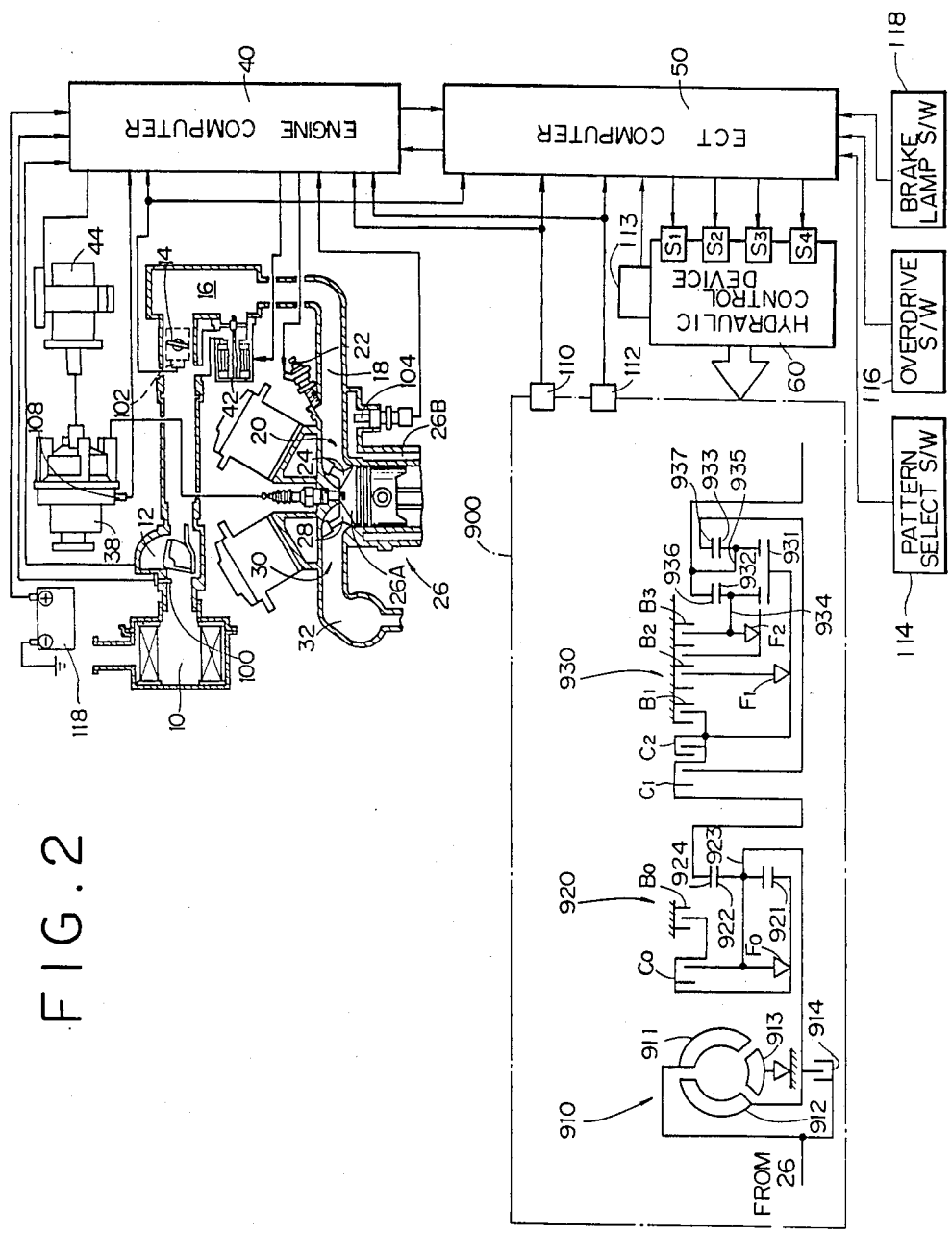
FIG. 2 is a sectional view partially including a block diagram, showing the general arrangement of the automatic transmission combined with an intake air flow sensing type electronic fuel injection engine, to which the device for controlling engine torque in a vehicle according to the present invention is applied.

FIG. 2 is the general arrangement drawing showing the automatic transmission combined with the intake-air quantity sensing type electronic fuel injection engine (hereinafter referred to as "ECT"), to which the present invention is applied.

Air taken into an air cleaner 10 is successively delivered to an air flow meter 12, an intake throttle valve 14, a surge tank 16 and an intake manifold 18. This air is mixed with fuel injected from an injector 22 in the proximity of an intake port, and further delivered to a combustion chamber 26A of a main body 26 of the engine through an intake valve 24. The exhaust gas produced due to the combustion of an air-fuel mixture in the combustion chamber 26A is exhausted to atmosphere through an exhaust valve 28, an exhaust port 30, an exhaust manifold 32 and an exhaust pipe (not shown).

An intake-air temperature sensor 100 for detecting intake air temperature is provided in the air flow meter 12. The intake throttle valve 14 rotates in operational association with an accelerator pedal (not shown), which is provided near a driver's seat in the vehicle. A throttle sensor 102 is provided at the intake throttle valve 14 for detecting a throttle opening degree thereof. A water temperature sensor 104 is provided in a cylinder block 26B of the main body 26 of the engine, for detecting an engine cooling water temperature. A crank angle sensor 108 is provided in a distributor 38 which has a shaft rotatable by a crankshaft of the main body 26 of the engine, for detecting a crank angle from the rotation of the shaft.

The ECT also includes a vehicle speed sensor 110 for detecting vehicle speed from the routine speed of an output shaft thereof, a shift position sensor 112 for detecting a shift position, and an oil temperature sensor 113 for detecting the oil temperature in a hydraulic control device 60. Outputs from these sensors 100, 102, 104, 108, 110, 112 and 113 are inputted to an engine computer 40 or ECT computer 50. Furthermore, an atmospheric pressure sensor 122 is provided, and the output signal of the sensor 122 is inputted into the engine computer 40. The engine computer 40 calculates a fuel injection flowrate and the optimum ignition timing by using the input signals from the sensors as parameters, and controls the injection 22 so that an amount of fuel commensurate to said fuel injection flowrate can be injected. The engine computer 40 also controls the ignition coil 44 so that the optimum ignition timing can be obtained. Furthermore, the engine computer 40 performs the torque down of the engine by introducing a lag angle to the ignition timing during shifting.

An idle rotation speed control valve 42 driven by a step motor is provided in a bypass passage linking the upstream side of the throttle valve 14 with the surge tank 16, whereby the idle rotation speed is controlled in response to a signal from the engine computer 40.

On the other hand, a transmission section 900 of the ECT in this embodiment includes a torque converter 910, an overdrive mechanism 920 and an underdrive (or speed reduction) mechanism 930.

The torque converter 910 includes a well-known pump 911, a turbine 912, a stator 913 and a lockup clutch 914.

The overdrive mechanism 920 includes a planetary gearing arrangement consisting of a sun gear 921, a planetary pinion 922 in mesh with the sun gear 921, a carrier 923 supporting the planetary pinion 922 and a ring gear 924 in mesh with the planetary pinion 922. The rotating condition of the planetary gearing arrangement is controlled by a clutch Co, a brake Bo and a one-way clutch Fo.

The underdrive (or speed reduction) mechanism 930 includes a dual planetary gearing arrangement consisting of a common sun gear 931, planetary pinions 932 and 933 which are in mesh with the sun gear 931 respectively, carriers 934 and 935 which support the planetary pinions 932 and 933 respectively, and ring gears 936 and 937 which are in mesh with the planetary pinions 932 and 933 respectively. The rotating condition of the planetary arrangement, and the connecting conditions from the overdrive mechanism, are controlled by clutches C1 and C2, brakes B1–B3 and one-way clutches F1 and F2. Since the connected state of the respective component parts of this transmission 900 is well known, only the skeleton diagram is shown in FIG. 2 and detailed description will be omitted.

In this embodiment, electromagnetic valves S1–S4 in a hydraulic control circuit 60 are driven and controlled in accordance with a preset shift pattern by an ECT computer which receives signals from the throttle sensor 102, the vehicle speed sensor 110 and so forth. The ECT computer then controls the combination of the clutches, brakes and the like as shown in FIG. 3, so that the shift control can be performed.

Additionally, marks ○ in FIG. 3 indicate the operated positions and marks ◉ indicate the operated positions only when the engine is power-on (when the engine torque is transmitted to the wheels, i.e., the engine brake does not occur).

Additionally, while in this embodiment the engine computer 40 and the ECT computer 50 are formed separately of each other, the number of the control components and control sharing areas need not be limited.

Figure 4:
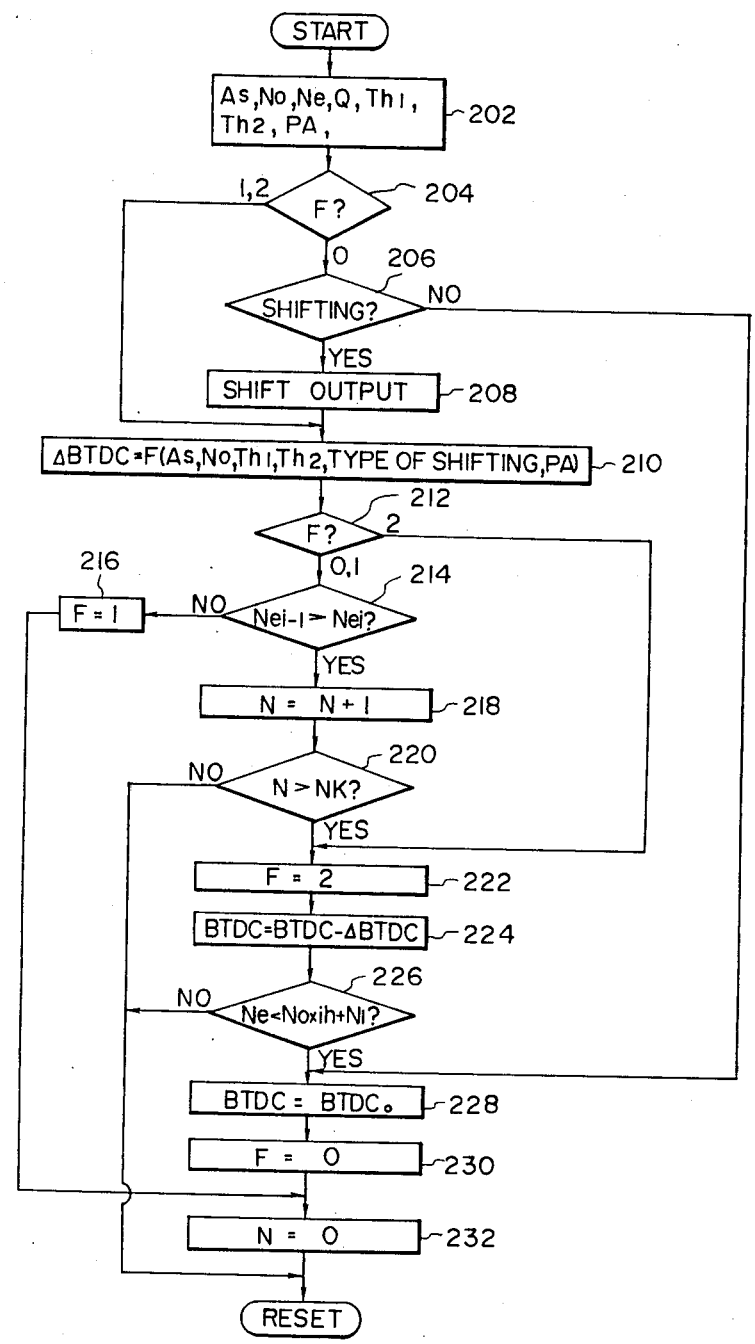
FIG. 4 is a flow chart showing an engine torque changing routine.

The control of engine torque in a vehicle in this embodiment is carried out in accordance with the flow chart shown in FIG. 4.

First, in Step 202, the throttle opening (engine load), the output shaft rotary speed (vehicle speed) No of the automatic transmission, the engine speed Ne, the intake air quantity Q, engine intake air temperature Th1, oil temperature Th2 of the automatic transmission and intake air pressure (atmospheric pressure) PA are read in, respectively.

A flag, designated at F in Step 204, for controlling a program is set at zero initially. Consequently, the routine proceeds to Step 206, where judgment of shifting (i.e. a decision of whether or not to shift) is performed in response to the throttle opening As, the vehicle speed No and the like in the same manner as in the past. As a result of this judgment, when a "no-shift" determination is made the routine proceeds to Step 228, where an ignition timing BTDC is set at a value BTDCo determined in association with Q/Ne (the intake air quantity per turn of the engine) and the engine speed Ne. Consequently, no particular operation of the ignition timing in association with the environmental factors is performed.

On the other hand, when a judgment that "a shift exists" is made in Step 206, the routine proceeds to Step 208, where the output for shifting is performed. In Step 210, an intake air temperature correction coefficient KTh1, an oil temperature correction coefficient KTh2 and an atmospheric pressure correction coefficient KPA, are determined, respectively, in association with various parameters read in, respectively, in Step 202. And a basic lag angle value ΔBTDCo is multiplied by these coefficients to thereby determine an ignition lag angle value ΔBTDC. Additionally, as shown in FIG. 6, the basic lag value ΔBTDCo is predetermined in association with the type of shifting, the throttle opening (engine load) and a selected position of a pattern select switch 114.

Figure 5:
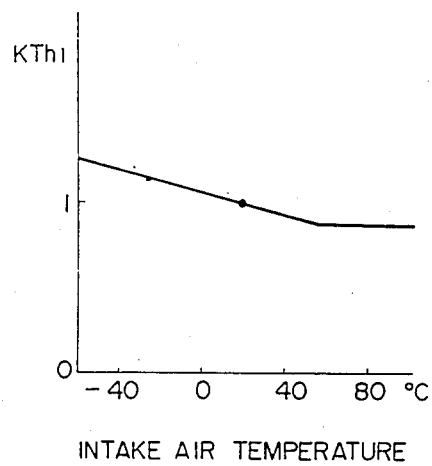
FIGS. 5(A)-5(F) are charts showing examples of maps for searching respective correction coefficients for the intake air temperature, the oil temperature of the automatic transmission, the atmospheric pressure, the boost pressure, the engine cooling water temperature and the engine oil temperature.
Figure 5:
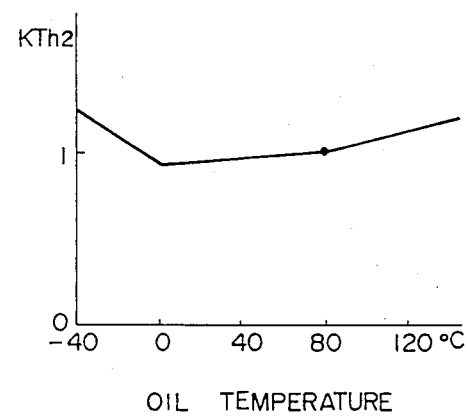
Figure 5:
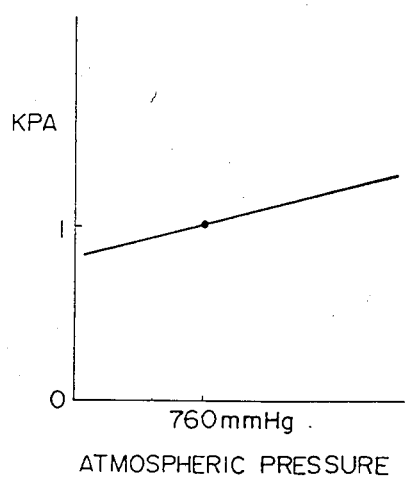
Figure 5:
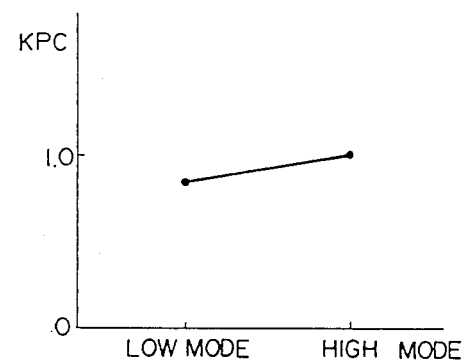
Figure 5:
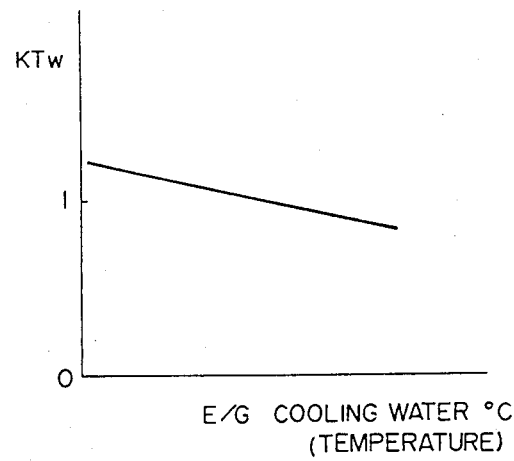
Figure 5:
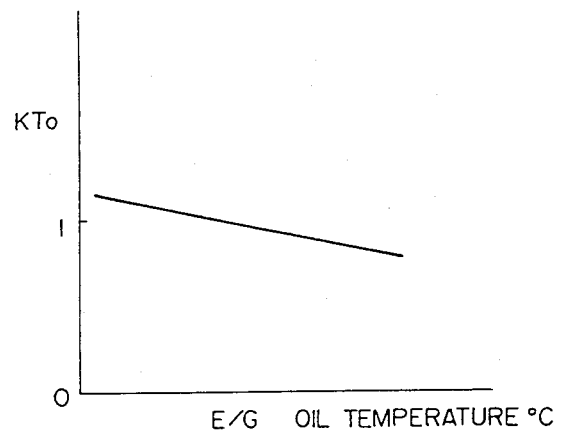

Furthermore, as shown in FIG. 5(a), the intake air temperature correction coefficient KTh is set such that the higher the intake air temperature the lower the intake air temperature correction coefficient KTh1. As shown in FIG. 5(B), the automatic transmission oil tempeature correction coefficient KTh2 is larger than 1 at the times of very low temperature and high temperature. Furthermore, as shown in FIG. 5(C), the atmospheric pressure correction coefficient KPA is set such that the higher the atmospheric pressure, the higher the atmospheric pressure correction coefficient KPA.

Additionally, in the case of an engine equipped with a supercharger, a boost pressure correction coefficient KPC may be provided separately of the atmospheric pressure correction coefficient KPA. In this case, the boost pressure correction coefficient KPC is set such that, during low mode, i.e. when the boost pressure is set low, the correction coefficient KPC becomes smaller (Refer to FIG. 5(D)).

Further, corrections may be made to adjust for variations in the engine cooling water temperature or engine oil temperature. In this case, respective correction coefficients KTw and KTo may be set as shown in FIGS. 5(E) and 5(F).

In Step 212, the flag F is judged. Since F=0 initially, the routine proceeds to Step 214, where it is determined whether the engine should begin. In this embodiment, due to the functions of Steps 216, 218 and 220, the initiation of engine torque-down is discriminated by determining or not the current engine speed Nei is smaller than the preceding engine speed Nei-1 for NK consecutive times.

After this condition (determining Nei<Ni is made NK consecutive times) is established, in Step 222 the flag F is set at 2, and in Step 224 the ignition timing BTDC is corrected by subtracting the ignition lag angle value ΔBTDC determined in Step 210. As a result, from this instant the engine computer controls the engine by the corrected ignition timing BTDC, so that a controlled engine torque-down can be carried out.

In Step 226, a determination is made as to whether a condition of return of the torque-down has been established. In this embodiment, establishment of the condition of return of the torque-down is indicated when the engine speed Nei is smaller than the vehicle speed No X the gear ratio ih + the constant Ni. Until the condition in this Step 226 is established, the control of the torque-down in Steps 210–226 is repeated.

When it is determined that the condition of return is established in Step 226, the ignition timing BTDC is replaced by the aforesaid BTDCo in Step 228, and further the flag F and the counter N are reset at zero in Steps 230 and 232 to thereby return to the start again.

In this embodiment, the change value of the torque-down is determined in association with the intake air temperature, the intake air pressure (atmospheric pressure) and the oil temperature in the hydraulic control device of the automatic transmission, so that an intended torque can be constantly obtained and the frictionally engaging devices can be allowed to operate an expected irrespective of the environmental conditions.

Figure 7:
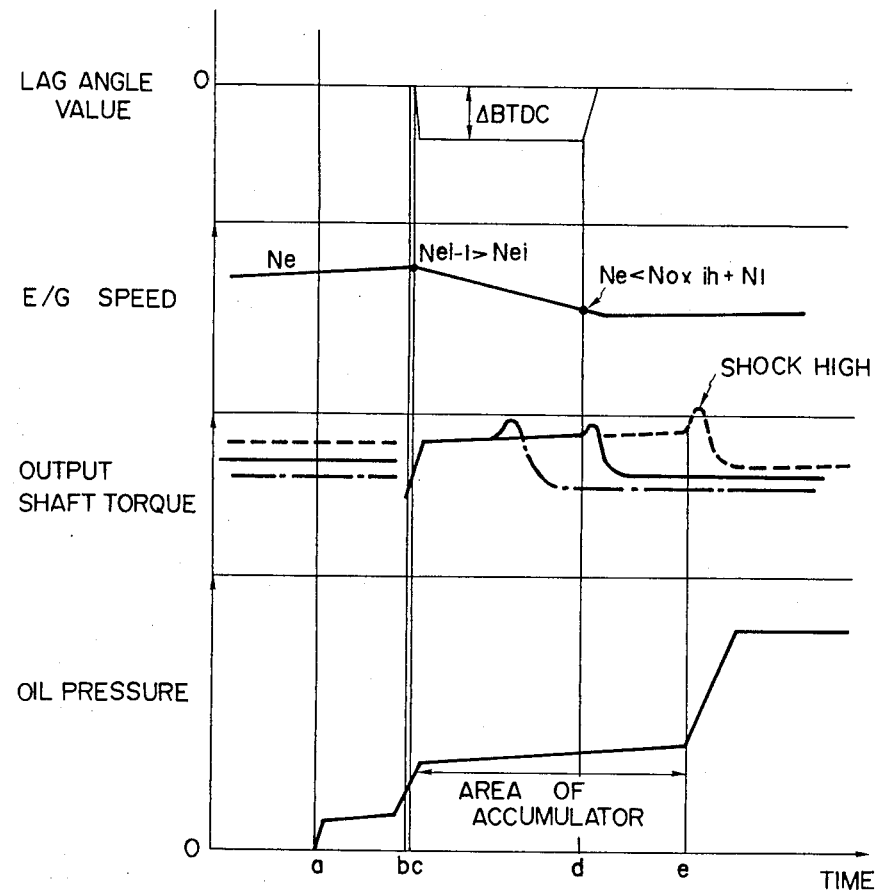
FIG. 7 is a shift characteristic chart showing the relationship between working oil pressure, output shaft torque of the automatic transmission, engine speed and a lag angle value, along the time axis, for qualitatively explaining the advantages of the present invention.

FIG. 7 qualitatively shows the advantages of the present invention. The drawing shows shift transition characteristics during power-on up-shift. The present invention includes means for correction to compensate for changes in oil level due to a change in oil temperature; however, here the oil level is regarded as being constant for the sake of simplification. Due to the change in engine torque, output shaft torque To fluctuates as shown. When the engine torque is high, the shift time duration is increased as indicated by broken lines in the drawing, whereby durability of the frictionally engaging devices is deteriorated. More-over, in an extreme case deteriorated shift shock occurs due to incomplete engagement within an area of the accumulator. In contrast, when the oil pressure level is set at a rather high value so as to obviate the above-described disadvantages, deteriorated shift shock occurs when the engine torque is low. According to the present invention, any thermal load on the frictionally engaging devices due to a change in engine torque can be released; moreover, corrections can be made such that the engine torque after the change can be constant. Furthermore, the engine torque is changed in consideration of the changes in the behavior of the frictionally engaging devices due to the oil temperature in the hydraulic device, so that satisfactory shift characteristics can be constantly obtained.

Additionally, in the above embodiment the torque-down of the engine is carried out by the lag angle of the ignition timing, however; the present invention, is not intended to be restricted to that means for changing the engine torque. For example, the engine torque can be changed by controlling the fuel supply quantity or the intake air quantity.

Furthermore, in the above embodiment the oil temperature in the hydraulic control device of the automatic transmission is detected by an oil temperature sensor which is mounted separately; however, according to the present invention the oil temperature in the automatic transmission need not necessarily be directly detected. For example, the cooling water temperature of the engine can be detected to estimate the oil temperature of the automatic transmission, and the control may be made on the basis of this estimated value.

Additionally, the present invention is based on the change value at the time of the engine torque change during shifting, and the starting time of change or the returning time need not necessarily be limited.

Furthermore, according to the present invention, when the intake air pressure to the engine is directly detected, the atmospheric pressure and the boost pressure may be considered as the same factor.

We claim:

1. A device for controlling engine torque in a vehicle which includes an engine and an automatic transmission, and for changing said engine torque during shifting of said automatic transmission by an engine torque change value determined in association with at least engine load, said device comprising:
   means for detecting intake air pressure of said engine;
   means for determining said engine torque change value in further association with at least said intake air pressure of the engine; and
   means for changing engine torque during shifting of said automatic transmission by said determined engine torque change value.

2. A device for controlling engine torque as set forth in claim 1, wherein said means for changing engine torque is means for changing the ignition timing of said engine.

3. A device for controlling engine torque as set forth in claim 1, wherein said means for changing engine torque is means for changing the quantity of fuel injected into said engine.

4. A device for controlling engine torque as set forth in claim 1, wherein said means for changing engine torque is means for changing the quantity of engine intake air.

5. A device for controlling engine torque in a vehicle which includes an engine and an automatic transmission, and for changing said engine torque during shifting of said automatic transmission by an engine torque change value determined in association with at least engine load, said device comprising:
   means for detecting at least one of engine cooling water temperature and engine oil temperature;
   means for determining said engine torque change value in further association with at least one of said engine cooling water temperature and said engine oil temperature; and
   means for changing engine torque during shifting of said automatic transmission by said determined engine torque change value.

6. A device for controlling engine torque as set forth in claim 5, wherein said means for changing engine torque is means for changing the ignition timing of said engine.

7. A device for controlling engine torque as set forth in claim 5, wherein said means for changing engine torque is means for changing the quantity of fuel injected into said engine.

8. A device for controlling engine torque as set forth in claim 5, wherein said means for changing engine torque is means for changing the quantity of engine intake air.

9. A device for controlling engine torque in a vehicle which includes an engine and an automatic transmission, and for changing said engine torque during shifting of said automatic transmission by an engine torque change value determined in association with at least engine load, said device comprising:
   means for detecting oil temperature in a hydraulic control device of said automatic transmission;
   means for determining said engine torque change value in further association with at least said oil temperature in the hydraulic control device of said automatic transmission; and
   means for changing the engine torque during shifting of said automatic transmission by said determined engine torque change value.

10. A device for controlling engine torque as set forth in claim 9, wherein said means for changing engine torque is means for changing the ignition timing of said engine.

11. A device for controlling engine torque as set forth in claim 10, wherein said oil temperature in the hydraulic control device of said automatic transmission is estimated by detection of the temperature of engine cooling water.

12. A device for controlling engine torque as set forth in claim 10, wherein said oil temperature in the hydraulic control device of said automatic transmission is estimated by detection of the oil temperature of said engine.

13. A device for controlling engine torque as set forth in claim 9, wherein said means for changing engine torque is means for changing the quantity of fuel injected into said engine.

14. A device for controlling engine torque as set forth in claim 13, wherein said oil temperature in the hydraulic control device of said automatic transmission is estimated by detection of the temperature of engine cooling water.

15. A device for controlling engine torque as set forth in claim 13, wherein said oil temperature in the hydraulic control device of said automatic transmission is estimated by detection of the oil temperature of said engine.

16. A device for controlling engine torque as set forth in claim 9, wherein said means for changing engine torque is a means for changing the quantity of engine intake air.

17. A device for controlling engine torque as set forth in claim 16, wherein said oil temperature in the hydraulic control device of said automatic transmission is estimated by detection of the temperature of engine cooling water.

18. A device for controlling engine torque as set forth in claim 16, wherein said oil temperature in the hydraulic control device of said automatic transmission is estimated by detection of the oil temperature of said engine.

19. A device for controlling engine torque as set forth in claim 9, wherein said oil temperature in the hydraulic control device of said automatic transmission is estimated by detection of the temperature of engine cooling water.

20. A device for controlling engine torque as set forth in claim 9, wherein said oil temperature in the hydraulic control device of said automatic transmission is estimated by detection of the oil temperature of said engine.

* * * * *